(No Model.)

N. WASHBURN.
CAR WHEEL.

No. 292,882.  Patented Feb. 5, 1884.

Witnesses.
S. N. Piper
E. A. Pratt

Inventor.
Nathan Washburn.
by R. H. Eddy atty.

UNITED STATES PATENT OFFICE.

NATHAN WASHBURN, OF ALLSTON, MASSACHUSETTS.

CAR-WHEEL.

SPECIFICATION forming part of Letters Patent No. 292,882, dated February 5, 1884.

Application filed August 1, 1883. (No model.)

*To all whom it may concern:*

Be it known that I, NATHAN WASHBURN, of Allston, in the county of Suffolk, of the Commonwealth of Massachusetts, have invented a new and useful Improvement in Railway-Car Wheels; and I do hereby declare the same to be described in the following specification and represented in the accompanying drawings, of which—

Figure 1:
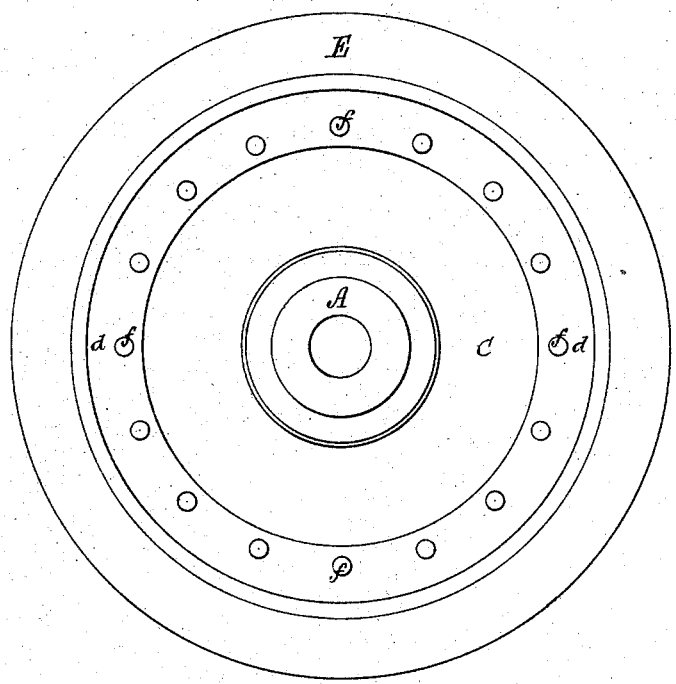
Figure 2:
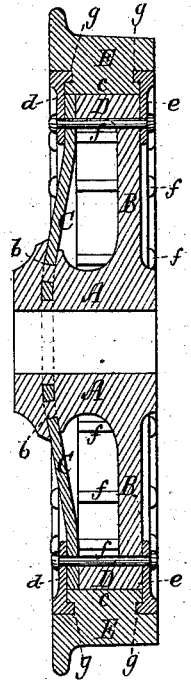
Figure 3:
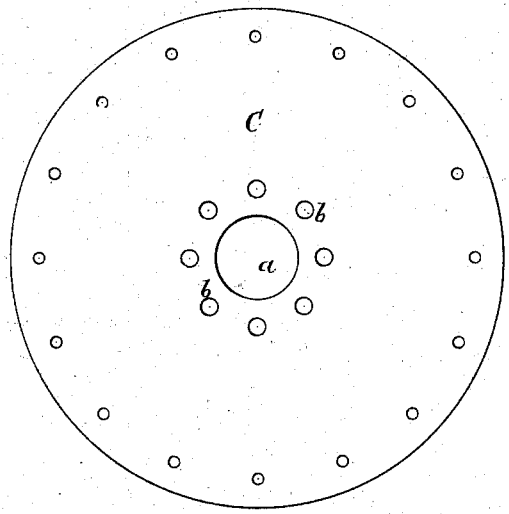

Figure 1 is a side elevation, and Fig. 2 a transverse section, of a car-wheel embodying my invention, the nature of which is defined in the claims hereinafter presented. Fig. 3 is a side view of the wrought-iron side plate of the wheel.

In carrying out my invention I found or cast in one piece of iron the hub A, one side plate, B, and the rim D. The other side plate, C, I have of wrought-iron, it being a disk having an eye, $a$, at its center, and a circular range of holes, $b$, surrounding the said eye. The wrought-iron plate C, so perforated, and dished or formed concavo-convex, if required, I place within the mold, for casting in one piece the hub and rim and the side plate connecting them; and I cast the hub upon and through the wrought-iron side plate, so that the latter shall extend within the hub in manner as represented in Fig. 2; and I also cast the rim at one edge of it against the said wrought-iron side plate.

The flanged tire E, of steel, I form with a dovetail, $c$, extending around and projecting from its inner periphery, and, after having shrunk or placed the tire upon and around the rim, I connect them by two flanged wrought-iron rings, $d$ $e$, and by a series of bolts or rivets, $f$, arranged as represented. The rings, by means of their flanges $g$, couple with the dovetail, and said rings overlap the two side plates, B and C, and the bolts or rivets go through such plates and the rings. I prefer to have the rivets or bolts arranged against the inner periphery of the rim, as in such case they serve as supports therefor. Such bolts or rivets may go through the rim, provided it be of sufficient thickness to receive them.

By having the rim separate from the wrought-iron side plate and in one piece with the other side plate and the hub, radial contraction of the connected side plate and rim can take place independently of the wrought-iron side plate.

A wheel of the kind described can be easily and economically produced and will possess great strength, with little danger of being broken while in use.

I claim—

1. In a railway-car wheel, the hub, rim, and one side plate of cast iron or metal founded in one piece, and upon and with the other side plate of wrought-iron extended around and into the hub and resting against one edge of the rim.

2. The hub, rim, and one side plate of cast iron or metal founded in one piece, and upon and within the other side plate of wrought-iron extended around and into the hub, and provided with holes for the metal of the hub to pass through, all being substantially as represented.

3. The improved railway-car wheel, constructed substantially as described, viz: with the hub, rim, and one side plate of cast-iron and founded in one piece, and upon and with the other side plate of wrought-iron extended around and into the hub and resting against one edge of the rim, in combination with the dovetailed tire and its connecting flanged ring, and the series of bolts arranged with and applied to the said rim and side plates, as set forth.

NATHAN WASHBURN.

Witnesses:
R. H. EDDY,
E. B. PRATT.